(12) United States Patent
Schalk et al.

(10) Patent No.: US 9,796,461 B2
(45) Date of Patent: Oct. 24, 2017

(54) PITCH ANGLE INDICATOR SYSTEM

(71) Applicant: Wartsila Netherlands B.V., Drunen (NL)

(72) Inventors: Peter Schalk, Drunen (NL); Bart Van Der Ven, Drunen (NL)

(73) Assignee: WARTSILA NETHERLANDS B.V., DM Drunen (NL)

( * ) Notice: Subject to any disclaimer, the term of this patent is extended or adjusted under 35 U.S.C. 154(b) by 171 days.

(21) Appl. No.: 14/900,090

(22) PCT Filed: Jun. 19, 2013

(86) PCT No.: PCT/FI2013/050676
§ 371 (c)(1),
(2) Date: Dec. 18, 2015

(87) PCT Pub. No.: WO2014/202824
PCT Pub. Date: Dec. 24, 2014

(65) Prior Publication Data
US 2016/0144939 A1    May 26, 2016

(51) Int. Cl.
*B63H 3/00* (2006.01)
*G01B 5/24* (2006.01)
*G01D 5/56* (2006.01)
*B63H 5/125* (2006.01)

(52) U.S. Cl.
CPC ............... *B63H 3/00* (2013.01); *G01B 5/24* (2013.01); *G01D 5/56* (2013.01); *B63H 5/125* (2013.01); *B63H 2003/006* (2013.01)

(58) Field of Classification Search
CPC .... B63H 3/00; B63H 2003/006; B63H 5/125; G01B 5/24; G01D 5/56
USPC ........... 116/26, 284; 33/530; 440/50; 416/61
See application file for complete search history.

(56) References Cited

U.S. PATENT DOCUMENTS

| 1,576,824 | A | * | 3/1926 | Heath | B64C 11/325 116/284 |
| 2,192,790 | A | * | 3/1940 | Havill | B64C 11/301 116/328 |
| 2,309,899 | A | * | 2/1943 | Hepperle | B63H 1/26 416/132 R |
| 2,554,716 | A |   | 5/1951 | Melius | |
| 2010/0133825 | A1 | * | 6/2010 | Gao | F03D 7/0204 290/44 |

FOREIGN PATENT DOCUMENTS

FR    502627     5/1920
WO    WO 89/10299 A1    11/1989

* cited by examiner

*Primary Examiner* — Daniel S Larkin
*Assistant Examiner* — Irving A Campbell
(74) *Attorney, Agent, or Firm* — Muncy, Geissler, Olds & Lowe, P.C.

(57) ABSTRACT

A pitch angle indicator system indicates a pitch angle of blades of a propeller of a marine propulsion unit. A mechanical link couples at least one of the blades to a first end of a first rod. An indicator is coupled to a second end of the first rod. The mechanical link is configured to convert a change in the pitch angle into a rotation of the first rod about its longitudinal axis. The indicator is configured to provide an indication of the amount of rotation of the first rod about the longitudinal axis.

14 Claims, 6 Drawing Sheets

PITCH ANGLE INDICATOR SYSTEM

TECHNICAL FIELD

The invention is related in general to providing an indication of the pitch angle of a ship's propeller. In particular the invention is related to a pitch angle indicator system that can be used in a steerable thruster.

BACKGROUND OF THE INVENTION

A marine propulsion system may have a propeller with variable pitch, meaning that the angle at which the blades of the rotating propeller meet the water can be changed. For reliable control there is needed a pitch angle indicator that provides a feedback signal indicative of the actual, measured pitch angle. The indication provided by the pitch angle indicator is typically transmitted in electric form for remote reading, but marine regulations may require a directly readable, mechanically produced visual indication.

Mechanically conveying a pitch angle indication signal from the propeller of a steerable thruster to inside the ship's hull is somewhat more complicated than in the case of direct shaft drive, because the propeller is on a horizontal shaft in the lower end of an azimuthally rotatable pod, i.e. a mechanical entity that turns about a vertical axis.

FIG. 1 is a simplified schematic illustration of a prior art solution for providing pitch angle feedback. A propeller 101 is installed on a horizontal propeller shaft 102. A vertical drive shaft 103 turns the propeller shaft 102 through a pair of meshing bevel gears 104 and 105. A hydraulic mechanism, which is not shown in FIG. 1, controls the pitch angle of the blades 106. Inside the hub of the propeller is a mechanical coupling 107 between the blades 106 and an inner rod or inner pipe 108, so that changing the pitch angle causes the inner pipe 108 to move back and forth in its longitudinal direction inside the propeller shaft 102, as illustrated with the arrow 109. A lever and hinge arrangement 110 converts this horizontal back and forth movement into a vertical up and down movement of a rod 111. The upper end of the rod 111, preferably equipped with a support member 112, moves an annular plate 113 up and down.

The lever and hinge arrangement 110, the rod 111, the support member 112, and the annular plate 113 are located in the azimuthally rotating part of the thruster. Attached to the fixed part, which does not move when the thruster rotates, is a vertical follower 114. The azimuthally rotating movement of the annular plate 113 does not affect the vertical follower 114, but the up and down movement of the annular plate 113—which is indicative of changes in the pitch angle—causes also the vertical follower 114 to move up and down in the direction of the arrow 115. The movements of the vertical follower 114 can be converted into an electric signal with an encoder 116. For providing a visual indication the vertical follower 114 may comprise, or it may be mechanically coupled to, a pointer 117, the position of which can be read against an adjacent scale 118.

The prior art arrangement of FIG. 1 may not give completely reliable readings, for example in cases where the annular plate 113 is not completely smooth and/or horizontal.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

The indication of a pitch angle of the blades of a propeller can be conveyed as a rotational movement of a rod, instead of the longitudinal movement of prior art mechanisms. A mechanical link is coupled between the blades and a first end of the rotating rod, and the indicator that detects the rotational movement of the rod is coupled to its second end. The mechanical link converts a change in pitch angle into a rotation of the rod, and the indicator is configured to provide an indication of what is essentially the amount of rotation of the rod about its longitudinal axis.

Using a rotational movement of the rod allows building the indicator mechanisms so that a more accurate and reliable indication of the pitch angle is provided. The system is preferably equipped with a compensator mechanism that compensates for other movements of the rod than those associated with pitch angle changes, especially if the system is located in a steerable thruster.

Advantageous embodiments of the invention are described in more detail later in this description as well as in the depending claims.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF EMBODIMENTS OF THE INVENTION

Figure 1:
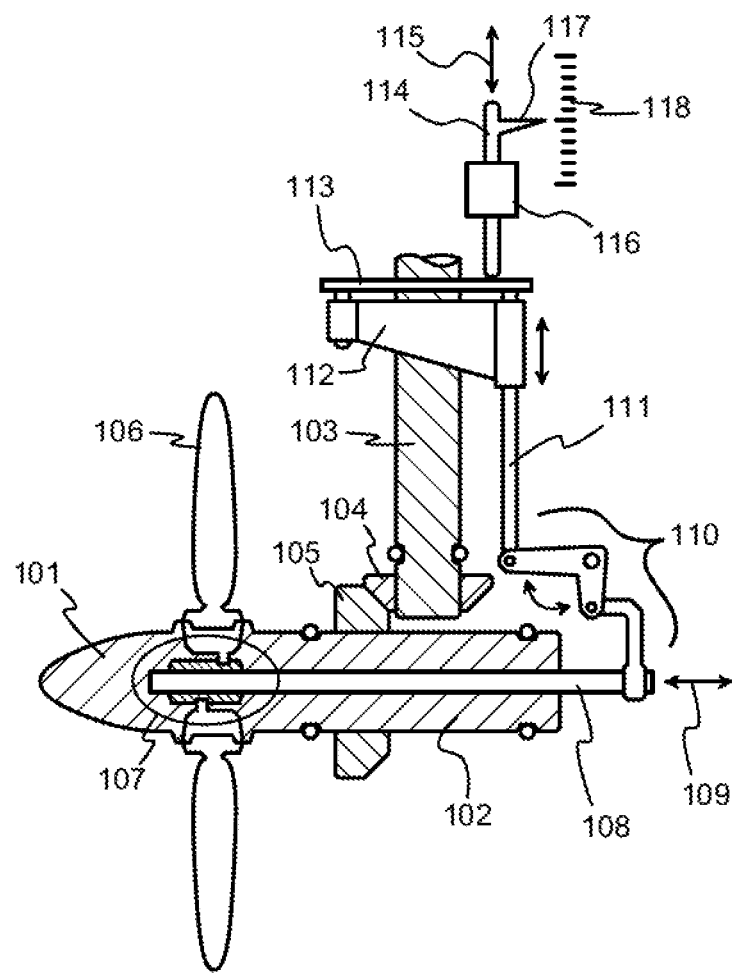
FIG. 1 illustrates a pitch angle indicator system according to prior art.
Figure 2:
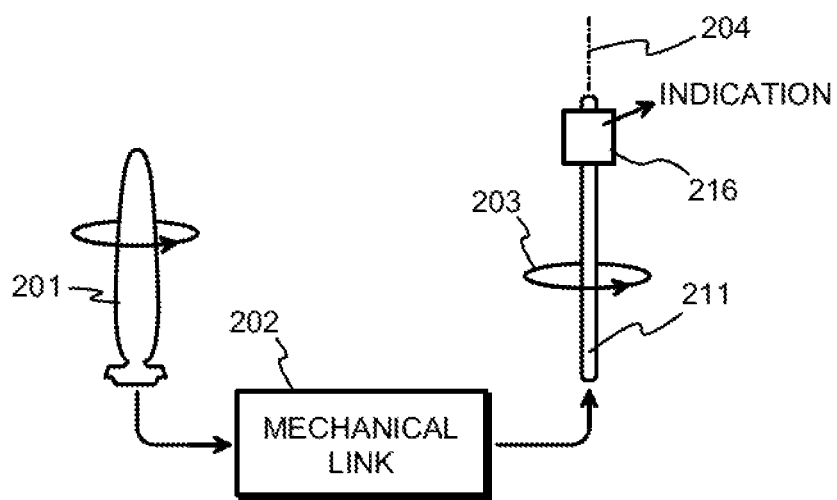
FIG. 2 illustrates the principle of using a rotational movement of a rod.

FIG. 2 illustrates an operating principle of a pitch angle indicator system. The system is meant for indicating the pitch angle of the blades 201 of a propeller that constitutes a part of a marine propulsion unit. In a manner that resembles some prior art solutions, the system comprises a first rod 211, and a mechanical link 202 coupled between at least one 201 of the blades of the propeller and a first (here: lower) end of the rod 211. The system comprises also an indicator 216 coupled to the second (here: upper) end of the rod 211. As a distinctive difference to prior art systems, the mechanical link 202 is configured to convert a change in pitch angle into a rotation 203 of the rod 211 about its longitudinal axis 204. The indicator 216 is configured to provide an indication of the amount of rotation of the rod 211 about its longitudinal axis.

Figure 3:
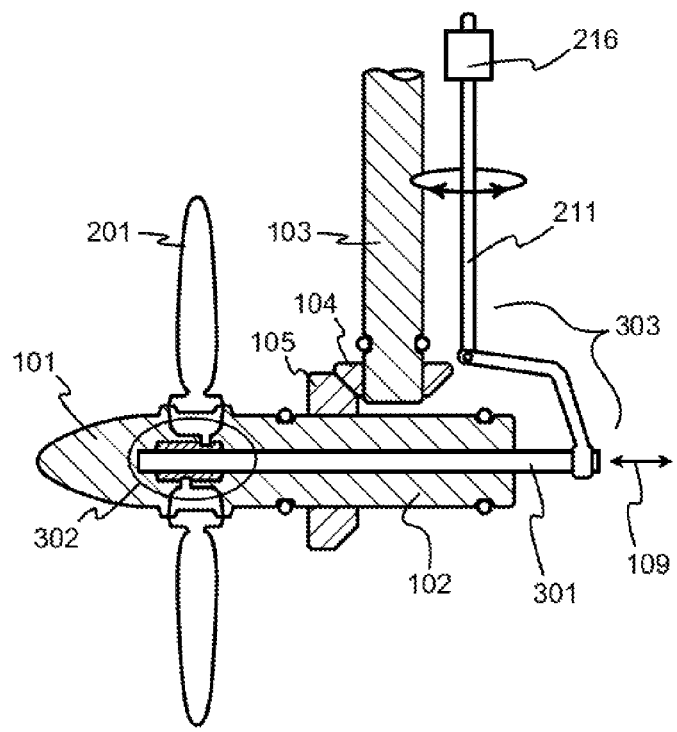
FIG. 3 illustrates schematically a marine propulsion unit with a pitch angle indicator system.

FIG. 3 is a simplified schematic illustration of an embodiment in which the pitch angle indicator system is comprised in a marine propulsion unit, more specifically a steerable thruster. In a manner known as such, a steerable thruster comprises an azimuthally rotatable pod, which comprises a (typically horizontal) propeller shaft, on which a propeller is mounted. According to an embodiment of the invention the rod designated the first rod above is comprised within the azimuthally rotatable pod, as is the mechanical link that couples it to the blade or blades of the propeller.

The marine propulsion unit of FIG. 3 comprises a propeller 101 with blades 201 that have a variable pitch angle. The mechanical link mentioned above comprises a horizontal rod, which can be designated the second rod 301 in order not to confuse it with the first rod mentioned above. The second rod 301 may be at least partly tubular, and it may have other functions, for example related to controlling the flow of hydraulic fluid that in turn controls the pitch angle. For the purpose described here it is sufficient that the second rod is capable of transmitting longitudinal movement, for which purpose the simple designation "rod" is enough, but this designation covers here also other forms of appropriate mechanical entities.

The propeller shaft is at least partly tubular in the embodiment of FIG. 3, and the second rod 301 is located at least partly inside the propeller shaft. A first joint 302 between at least one of the blades 201 and the second rod 301 is configured to convert a change in pitch angle into a longitudinal movement of the second rod 301. Prior art systems are known where the pitch angle is converted into a longitudinal movement of a rod located inside a tubular propeller shaft, and for the purposes of the present invention it is not significant, what is the exact nature and technical implementation of the first joint.

Figure 4:
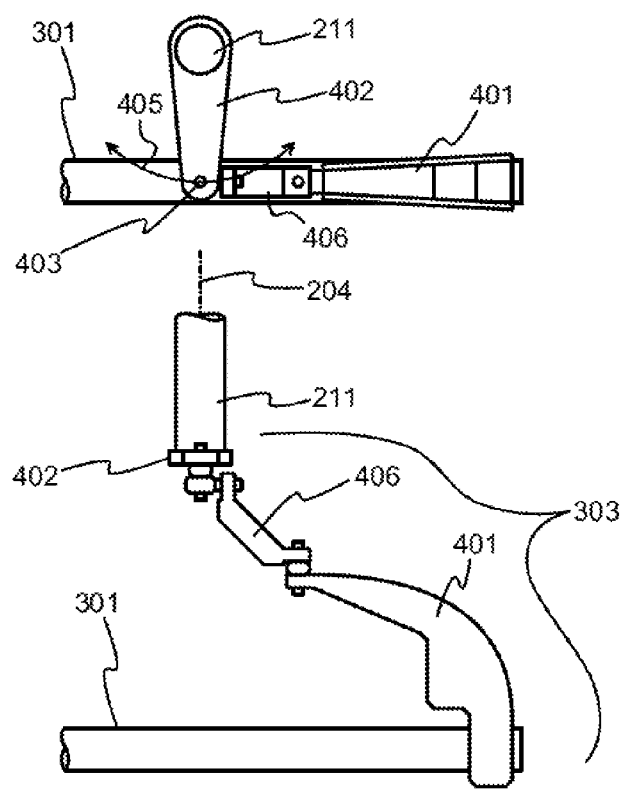
FIG. 4 illustrates an example of a detail in a mechanical link.

A second joint, schematically illustrated as 303 in FIG. 3, between the second rod 301 and the first rod 211 is configured to convert a longitudinal movement of the second rod 301 into a rotation of the first rod 211 about its longitudinal axis. FIG. 4 illustrates an example of how the second joint 303 can be implemented in practice. The upper part of FIG. 4 illustrates the front end of the second rod 301, and the exemplary implementation of the second joint, in a top view. The lower part of FIG. 4 illustrates the same parts in a side view.

A transmitting arm 401 is attached to the second rod 301. A pivot arm 402 is attached to the first rod 211, and extends to a hinge point 403 that is offset from the longitudinal axis 204 of the first rod 211. Taken that the first rod 211 is mounted on bearings (not shown), moving the hinge point 403 in the direction of the double-headed arrow 405 turns the first rod 211 about its longitudinal axis 204. A link piece 406 is pivotally attached between the transmitting arm 401 and the hinge point 403 in the pivot arm 402, so that any longitudinal movement of the second rod 301 is converted into a rotation of the first rod 211 about its longitudinal axis 204. The pivotal attachments at the ends of the link piece 406 are needed because when the hinge point moves according to arrow 405, the movements of the end points of the link piece 406 make it turn in relation to both the transmitting arm 401 and the pivot arm 402.

The propeller shaft and the blades rotate together about the longitudinal axis of the propeller shaft to create the thrust for the vessel. Since the second rod 301 is inside the propeller shaft in the embodiment shown in FIG. 3, either it must rotate along with the propeller shaft (in which case a rotating connection must be used between the second rod 301 and the transmitting arm 401) or the coupling between the second rod 301 and the propeller shaft must allow the last-mentioned to rotate without rotating the second rod 301.

Figure 5:
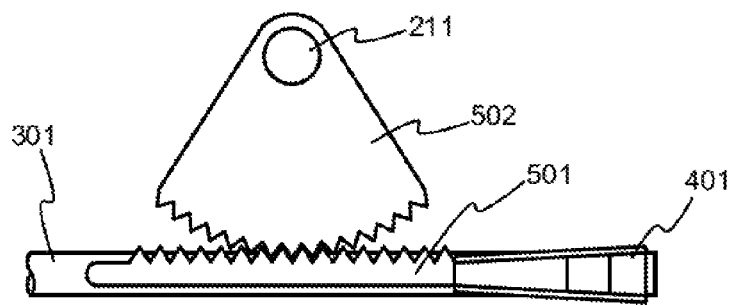
FIG. 5 illustrates an implementation that is alternative to that of FIG. 4.

FIG. 5 illustrates schematically an example of an alternative implementation of the second joint. In this implementation the transmitting arm 401 that is attached to the second rod 301 comprises a gear rack 501, which meshes with a sector gear 502 attached to the first rod 211.

Figure 6:
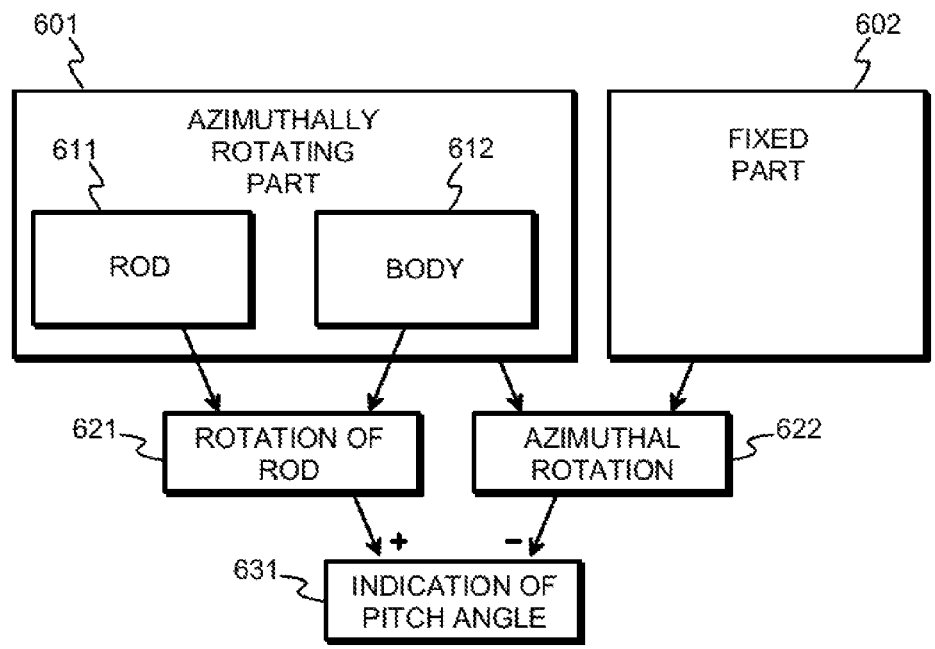
FIG. 6 illustrates the principle of compensating for other movements.

FIG. 6 illustrates a principle of compensating for other movements in providing an indication of a pitch angle. This principle becomes actual especially if the pitch angle indicator system constitutes a part of a steerable thruster. Such an arrangement involves an azimuthally rotating part 601, which comprises the thruster proper and may comprise auxiliary systems and components, the operation of which benefits from making them move along with the azimuthal rotation of the thruster. The fixed part 602 in FIG. 6 represents all such parts that are stationary in relation to the hull of the vessel, i.e. that do not rotate azimuthally along with the thruster.

A rod 611, an example of which has been designated above as the first rod, is configured to indicate the pitch angle with an angular displacement about its longitudinal axis. Since the rod 611 is comprised within the azimuthally rotating part 601, it is natural to think about its angular displacement in the coordinate system defined by the azimuthally rotating part 601. This is schematically illustrated in FIG. 6 by deriving the angular displacement of the rod in block 621 as a comparison between the rod 611 and the body 612 of the azimuthally rotating part 601. However, at the same time the azimuthally rotating part 601 as a whole may have an (azimuthal) angular displacement in relation to the fixed part 602, as illustrated with block 622. In order to compensate for the (azimuthal) angular displacement of the whole azimuthally rotating part 601, denying an indication of the pitch angle must involve subtracting that part of the change in angular displacement of the rod that only results from the (azimuthal) angular displacement of the whole azimuthally rotating part 601. This is illustrated as block 631 in FIG. 6.

Several possibilities exist for implementing the principle of FIG. 6 in practice. For example placing the entire indicator of pitch angle as into the azimuthally rotating part is sufficient to implement the compensation, but—especially if the indicator must be manually readable—it may result in a somewhat awkward arrangement because the indicator must be accessible irrespective of into which azimuthal position it has moved along with the thruster. As an alternative, a first rotation encoder can be used to electrically measure the rotation of the rod and a second rotation encoder to separately measure the rotation of the thruster. A signal processor can then be used as block 631, which signal processor is configured to receive signals from each of said first and second rotation encoders and to output a combination of said signals. Such an arrangement works well, but marine classification requirements may dictate that also a mechanically provided indication must be available in case the electrical systems fail.

A change in the classification requirements may be underway at the time of writing this text, which would allow replacing the mechanically provided indication with battery backup for the electrical systems. Therefore when the so-called indicator boxes are described later in this text, it should be noted that the present invention applies regardless of whether the gears and indicators required by the provision of mechanical indication are included.

In the following we describe embodiments where the coupling between the (upper end of the) first rod and the indicator comprises a third joint that is configured to convert a rotation of said first rod about its longitudinal axis into a rotation of an indicator shaft. Additionally the coupling comprises a compensator mechanism that is configured to compensate for movements of a larger entity, part of which is said first rod, from the indication provided by the indicator. The steerable thruster is an example of such a larger entity.

Figure 7:
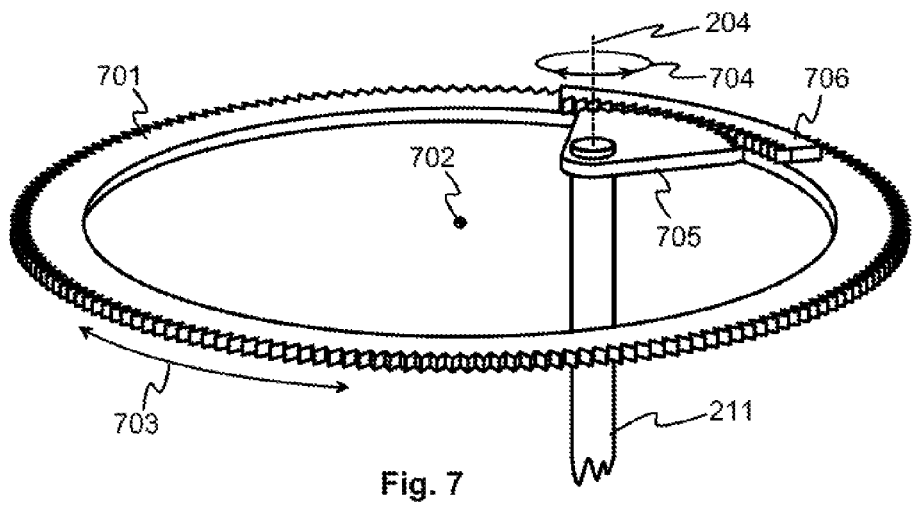
FIG. 7 illustrates an example of a detail in the coupling to indicator.

FIG. 7 illustrates an arrangement where a third joint of the kind mentioned above comprises a first gear rim 701, the center point of which is illustrated as 702. Most advantageously the center point 702 is located on the main azimuthal rotation axis of the thruster, for reasons that become more apparent in the continuation. The first gear rim 701 is attached to the azimuthally rotating part of the thruster, but not fixedly: the mounting of the first gear rim 701 may comprise a slip ring, which allows the first gear rim 701 to turn about its center point 702 in relation to the rest of the thruster. Such a turning movement is illustrated with the double-headed arrow 703.

The upper end of the first rod 211 is seen in FIG. 7. A turning mechanism is configured to convert a rotation 704 of the first rod 211 about its longitudinal axis 204 into rotation 703 of the first gear rim 701 about its center point 702. In the embodiment of FIG. 7 the turning mechanism comprises a sector gear 705 attached to the first rod 211 and a matching inner gear rack 706 attached to the first gear rim 701. Instead of separate outer gear rim and inner gear rack one could use a simple inner gear rim, which meshed with both the sector gear and the appropriate gear in the indicator box described later.

Figure 8:
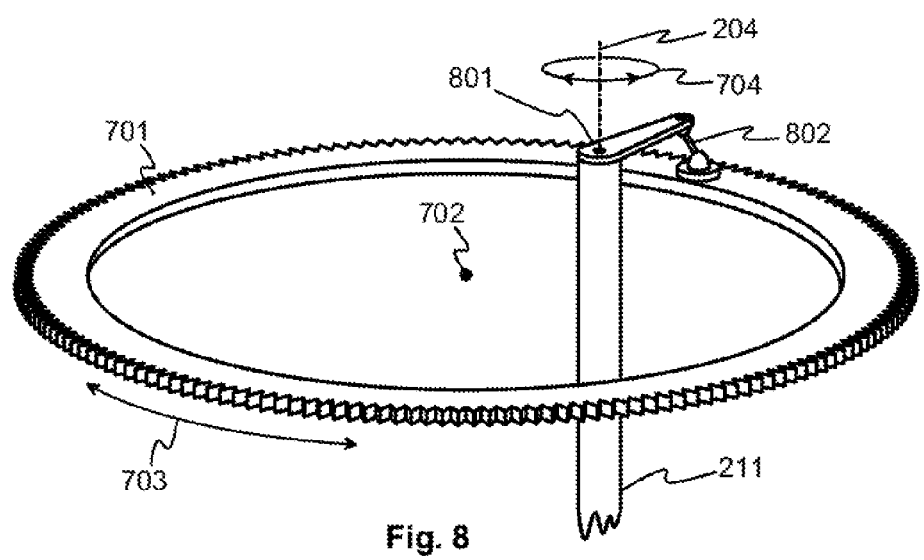
FIG. 8 illustrates an implementation that is alternative to that of FIG. 7

FIG. 8 illustrates an alternative embodiment of a turning mechanism: here the rotation 704 of the first rod 211 about its longitudinal axis 204 is converted into rotation 703 of the first gear rim 701 about its center point 702 through a pivot arm 801 attached to the first rod 211 and a pivotally mounted link connection 802 that connects the outer end of the pivot arm 801 to the first gear rim 701. Also in this embodiment the first gear rim 701 of the illustrated outer kind could be replaced with an inner gear rim.

Above it was pointed out that even if the first gear rim 701 is attached to and constitutes a part of the azimuthally rotating part of a steerable thruster, it can rotate about its center point in relation to the rest of the azimuthally rotating part. We may assume that the azimuthally rotating part comprises also a second gear rim, which can be either an inner gear rim 901 as in FIG. 9 or an outer gear rim 1001 as in FIG. 10. The second gear rim is concentric with the first gear rim, and it can be for example the main gear rim, through which the very azimuthal rotation of the steerable thruster is transmitted. Thus, contrary to the first gear rim 701, the second gear rim certainly does not turn in relation to the rest of the steerable thruster; it constitutes a major component of the whole azimuthally rotatable part of the thruster. The second gear rim is configured to maintain its rotational position in relation to the first gear rim when the pitch angle is constant. The last-mentioned feature is a consequence of how the pitch angle indicator system is built: it only allows the first gear rim to move in relation to the rest of the thruster when the pitch angle changes.

As a part of what we call a first transmission in the continuation, a first gear wheel 911 meshes with the first gear rim 701. As a part of what we call a second transmission in the continuation, a second gear wheel 912 meshes with the second gear rim. The central axes of the first and second gear wheels 911 and 912 remain stationary in relation to the fixed part, so any rotation (in relation to the fixed part) of the first and/or second gear rims about their common center point will turn the appropriate one(s) of the first and second gear wheels 911 and 912 respectively.

Figure 11:
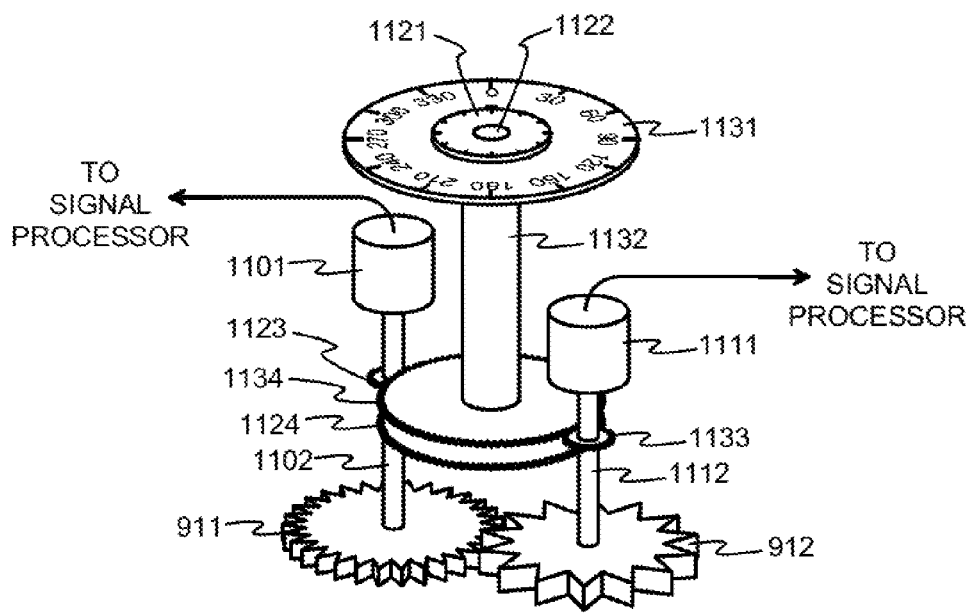
FIG. 11 illustrates an embodiment of an indicator with transmissions.

FIG. 11 shows how the first and second gear wheels 911 and 912, as well as the first and second transmissions they belong to, constitute parts of the so-called indicator box, so named because in a typical practical implementation the parts illustrated in FIG. 11 would be enclosed in a case (not shown in FIG. 11). The indicator box of FIG. 11 is designed to give both electric and manually readable indications. We will first consider the way in which the electric indications are produced.

The indicator box comprises a first rotational encoder 1101, which is an electromechanical sensor, the output signal of which is indicative of the angular displacement of the encoder shaft 1102 to which the rotational encoder is coupled. Rotational encoders are well known on this technical field. Concerning the production of electric indications of pitch angle we may call the encoder shaft 1102 an indicator shaft. In the sense of producing electric indications of pitch angle, the first transmission mentioned above comprises only the first gear wheel 911: it is configured to convert a rotation of the first gear rim 701 (see FIG. 9 or FIG. 10) into rotation of the encoder shaft 1102. In the absence of any azimuthal rotation of a steerable thruster or the like, the signal produced by the first rotational encoder 1101 directly represents the pitch angle. This signal is taken to a signal processor (not shown) that uses it to produce an output signal indicative of the pitch angle.

Assuming that a steerable thruster is concerned, also an indication of its current azimuthal displacement is desired, both for using it alone and for using it to correct the pitch angle indication. For that purpose the indicator box of FIG. 11 comprises a second rotational encoder 1111, the shaft of which is here called the first compensator shaft 1112. The second gear wheel 912 constitutes the second transmission mentioned above: it is configured to convert a rotation of said second gear rim (see FIG. 9 or FIG. 10) into rotation of the first compensator shaft 1112. Since the second gear rim is fixedly attached to the azimuthally rotating part of the thruster, the signal produced by the second rotational encoder 1111, which tells the angular displacement of the compensator shaft 1112, directly represents the steering angle. This signal is taken to a signal processor (not shown) that uses it to produce an output signal indicative of the steering angle.

The signal processor is typically located in the central processing system of the vessel, although distributed implementations are possible where a signal processor may be located at or very close to the indicator box, and send more refined data up to the central processing system of the vessel. The signal processor is configured to receive signals from each of the first 1101 and second 1102 rotation encoders and to output a combination of said signals. Due to the location of the first gear rim in the azimuthally rotating part, the signal produced by the first rotational encoder 1101 contains both a pitch-angle-related component and an azimuthal-displacement-related (i.e. steering-angle-related) component. The signal produced by the second rotational encoder 1111 only represents the azimuthal displacement, so by adding its inverse to the signal produced by the first rotational encoder 1101 the signal processor obtains an output signal indicative of the pitch angle alone.

Next we consider the way in which manually readable indications are produced in the indicator box of FIG. 11. For producing manually readable indications the system comprises a first indicator disc 1121 mounted on a shaft 1122. Since manually readable indications are now concerned, the designation "indicator shaft" can now be used of the shaft 1122 of the first indicator disc 1121. The first transmission, which is configured to convert a rotation of the first gear rim (see FIG. 10) into a rotation of the indicator shaft now comprises the first gear wheel 911, the encoder shaft 1102, a third gear wheel 1123 mounted on the encoder shaft 1102 and a fourth gear wheel 1124 mounted on the indicator shaft. In the absence of any azimuthal rotation of a steerable thruster or the like, the angular displacement of the first indicator disc 1121 directly represents the pitch angle. Said angular displacement can be read e.g. from a scale on the first indicator disc against an external pointer, or from an external scale against a pointer on the first indicator disc.

A second indicator disc 1131 is concentric with the first indicator disc 1121 and mounted on a shaft 1132, which in turn is concentric with the shaft 1122 of the first indicator disc 1121. The role of the second indicator disc 1131 is related to compensating for the azimuthal-displacement-related changes in the reading produced by the first indicator disc, so its shaft 1132 can be called the second compensator shaft. The second transmission, which is configured to convert a rotation of the second gear rim (see FIG. 10) into rotation of the second compensator shaft, now comprises the second gear wheel 912, the first compensator shaft 1112, a fifth gear wheel 1133 mounted on the first compensator shaft 1112, and a sixth gear wheel 1134 mounted on the second compensator shaft 1132. The angular displacement of the second indicator disc 1131 indicates the azimuthal displacement of the steerable thruster, i.e. the steering angle. Said angular displacement can be read e.g. from a scale on the second indicator disc against an external pointer, or from an external scale against a pointer on the second indicator disc.

Figure 9:
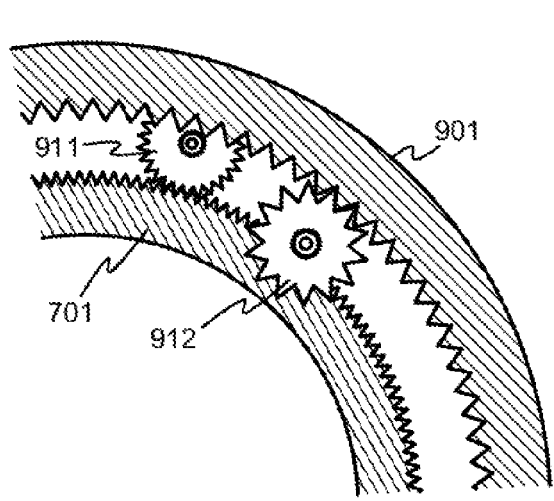
FIG. 9 illustrates another example of a detail in the coupling to indicator.
Figure 10:
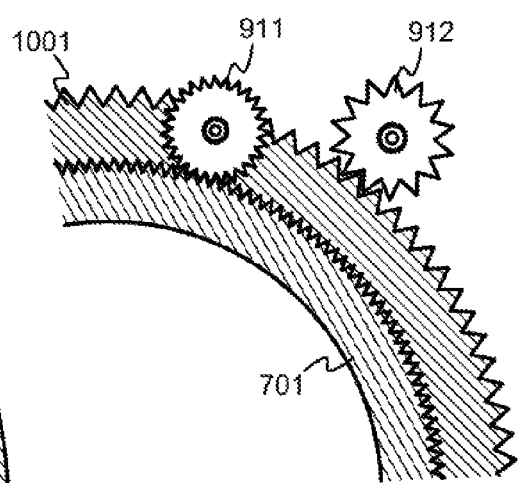
FIG. 10 illustrates an implementation that is alternative to that of FIG. 9
Figure 12:
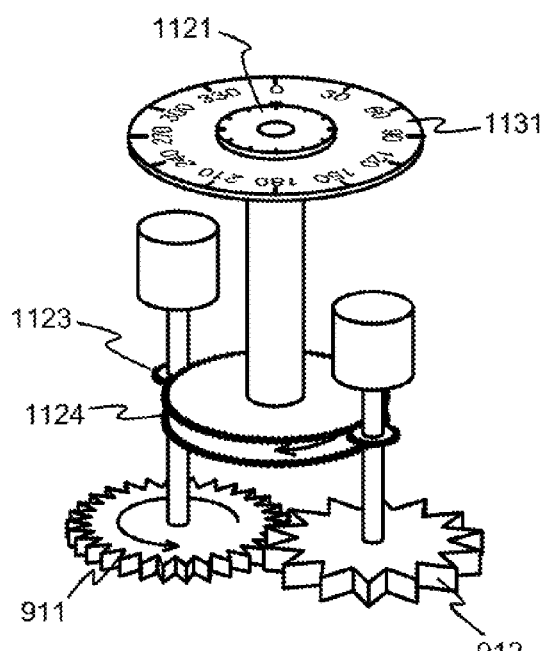
FIG. 12 illustrates the operation of the indicator of FIG. 11 under certain operating conditions.
Figure 13:
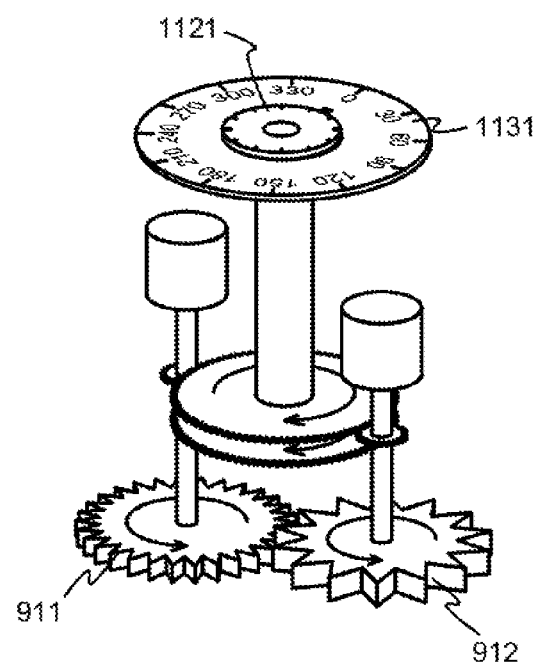
FIG. 13 illustrates the operation of the indicator of FIG. 11 under certain other operating conditions.

FIGS. 12 and 13 illustrate the operation of an indicator box of the kind shown in FIG. 9 when only pitch angle changes (FIG. 12) and when only steering angle changes (FIG. 13). We assume that the second gear rim is of the type shown earlier in FIG. 10, i.e. an external gear rim that meshes with the second gear wheel 912. In FIG. 12 only the pitch angle changes. This means that the second gear rim remains stationary in relation to the fixed part, to which the indicator box is attached. The second gear wheel 912 does not turn, so also the second indicator disc 1131 remains stationary.

The changing pitch angle causes the so-called first rod (not shown in FIG. 12) in the pitch angle indicator system to rotate about its longitudinal axis, which in turn causes the first gear rim (not shown in FIG. 12) to rotate about its center point. This causes the first gear wheel 911 to rotate as shown in FIG. 12. The third gear wheel 1123 rotates the fourth gear wheel 1124, which eventually rotates the first indicator disc 1121. If there is e.g. a scale on the first indicator disc 1121 and a pointer on the second indicator disc 1131, the pointer now shows on the scale how the pitch angle changes.

In FIG. 13 only the steering angle changes. The first and second gear rims (see FIG. 10) rotate exactly as much about their common center point. This causes both the first and second gear wheels 911 and 912 to rotate, both in the same direction (if the second gear rim was of the inner type shown in FIG. 9, the first and second gear wheels would rotate in opposite directions). If the transmission relations are correct, the eventual result is that both the first indicator disc 1121 and the second indicator disc 1131 rotate exactly as much in the same direction. Since the pitch angle reading is obtained from the first indicator disc in relation to the second indicator disc, the reading does not change.

If both the pitch angle and the steering angle changed simultaneously, both the first and second transmissions would move as in the case of FIG. 13, but in different amounts. The result would be that the both the first indicator disc and the second indicator disc rotated, but at different angular speeds.

Figure 14:
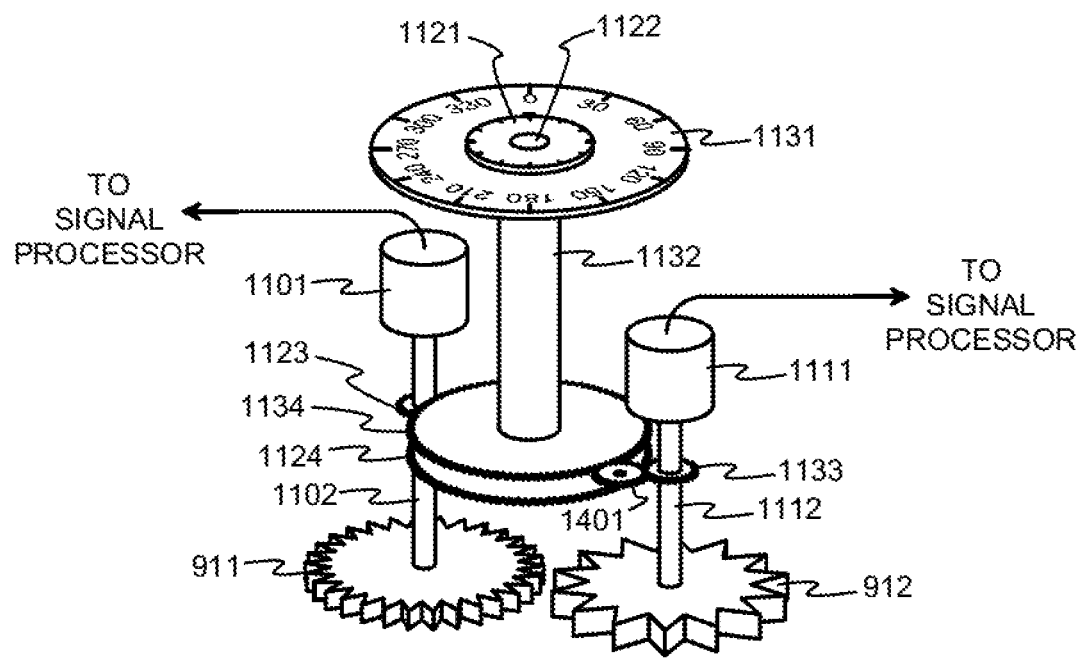
FIG. 14 illustrates an example of switching a rotating direction in an indicator.

The implementation of an indicator box shown in FIGS. 11 to 13 is only an example, and a large number of alternative implementations could be presented. For example, if the second gear rim was of the type illustrated in FIG. 9, an additional change in rotating direction should be made in one of the first and second transmissions, for example by adding another gear wheel 1401 like in FIG. 14 or by replacing a pair of meshing gear wheels with a pair of pulleys. The roles of the inner and outer shafts and their associated indicator discs could be exchanged, associated with the appropriate changes in the scale and pointer arrangements, and the like.

Figure 15:
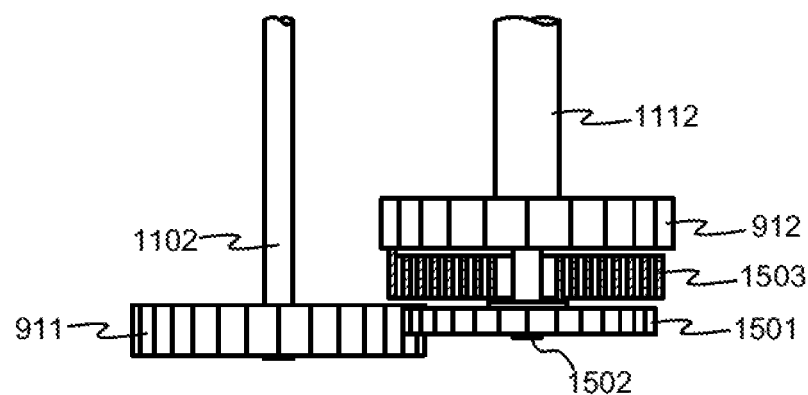
FIG. 15 illustrates an example of spring loading in an indicator.

A feature that could be added to any of the indicator box types discussed above is spring loading between the pitch angle indication subsystem and the steering angle indication subsystem to eliminate the effect of free play. FIG. 15 illustrates schematically one possible way of implementing spring loading. The first gear wheel 911 and the second gear wheel 912 are shown, mounted on their corresponding axes 1102 and 1112 respectively. A spring loader gear wheel 1501, which meshes with the first gear wheel 911, is mounted concentrically with the second gear wheel 912, but on an independent axis 1502. In the exemplary embodiment of FIG. 15 the axis 1112 of the second gear wheel 912 is tubular, and the axis 1502 of the spring loader gear wheel 1502 is mounted on bearings (not separately shown in FIG. 15) inside the axis 1112. A spiral spring 1503 couples the spring loader gear wheel 1501 to the second gear wheel 912.

We assume that the spring-loaded indicator box of FIG. 15 is used together with a second gear rim that is of the type shown earlier in FIG. 9. In other words, the second gear rim is an internal gear rim that meshes with the second gear wheel 912. In such an arrangement when only the steering angle changes, the first gear wheel 911 and the second gear wheel 912 rotate at the same angular speed but into opposite directions. The spring loader gear wheel 1501 always rotates to the opposite direction than the first gear wheel 911. Thus the tension of the spiral spring 1503 does not change when only steering angle changes. Changes in only the pitch angle cause the first gear wheel 911 to rotate while the second gear wheel 912 remains stationary, so the spiral spring 1503 either loosens or tightens, depending on the sign of the change in pitch angle. However, with appropriate pretensioning, it can be ascertained that the spiral spring 1503 always loads the rotating parts in only one direction, thus eliminating the effect of free play. As an alternative for the spiral spring and the sensors 1101 and 1111 simple servo motors can be used with an integrated encoder taking care for the signal to the processor like 1101 and 1111 and giving an controlled torque that prevents the effect of free play.

In a typical steerable thruster the azimuthally rotatable pod comprises a vertical shank, so that a vertical axis of the shank is the rotation axis of the azimuthal rotation. An upper end of the shank defines a level at which the azimuthally rotatable pod connects to the hull of a vessel. The invention allows the upper end of the first rod to extend out of the upper end of the shank, so that the indicator can be located well inside the hull of the vessel. Or, even if the actual upper end of the first rod was still inside the shank, the coupling between the first rod and the indicator may nevertheless extend out of the upper end of the shank.

The detailed embodiments that have been described above only serve as examples of how the invention can be implemented in practice, and allow further variations and developments without departing from the scope of the appended claims. For example, even if the invention has been described above mainly in association with a steerable thruster, the principle of conveying the information about pitch angle in the form of a rotating movement of a rod can be applied also in cases where no azimuthal displacement of the propulsion unit occurs.

The invention claimed is:

1. A pitch angle indicator system for indicating a pitch angle of blades of a propeller of a marine propulsion unit, comprising:
    a first rod,
    a mechanical link coupled between at least one of said blades and a first end of said first rod, and
    an indicator coupled to a second end of said first rod,
in which:
    said mechanical link is configured to convert a change in said pitch angle into a rotation of said first rod about its longitudinal axis, and
    said indicator is configured to provide an indication of the amount of rotation of said first rod about said longitudinal axis,
in which the coupling between said first rod and said indicator comprises:
    a third joint configured to convert a rotation of said first rod about its longitudinal axis into a rotation of an indicator shaft, and
    a compensator mechanism configured to compensate for movements of a larger entity, part of which is said first rod, from the indication provided by the indicator,
said third joint comprises:
    a first gear rim,
    a turning mechanism configured to convert a rotation of said first rod about its longitudinal axis into rotation of said first gear rim about its center point,
    a first rotational encoder with an encoder shaft that also constitutes said indicator shaft, and
    a first transmission configured to convert a rotation of said first gear rim about its center point into rotation of said encoder shaft,
and that said compensator mechanism comprises:
    a second gear rim, concentric with said first gear rim and configured to maintain its rotational position in relation to the first gear rim when the pitch angle is constant,
    a second rotation encoder with a first compensator shaft,
    a second transmission configured to convert a rotation of said second gear rim about its center point into rotation of said first compensator shaft, and
    a signal processor configured to receive signals from each of said first and second rotation encoders and to output a combination of said signals.

2. The pitch angle indicator system according to claim 1, wherein said mechanical link comprises:
    a second rod,
    a first joint between said at least one of said blades and said second rod, configured to convert a change in said pitch angle into a longitudinal movement of said second rod, and
    a second joint between said second rod and said first rod, configured to convert a longitudinal movement of said second rod into a rotation of said first rod about its longitudinal axis.

3. The pitch angle indicator system according to claim 2, wherein said second joint comprises:
    a transmitting arm attached to said second rod,
    a pivot arm attached to said first rod, said pivot arm extending to a hinge point offset from the longitudinal axis of the first rod, and
    a link piece pivotally attached between said transmitting arm and said hinge point in the pivot arm.

4. The marine propulsion unit, comprising:
    a propeller with blades that have a variable pitch angle, and
    a pitch angle indicator system according to claim 1 for indicating the pitch angle of the blades of said propeller.

5. The marine propulsion unit according to claim 4, wherein:
    the marine propulsion unit comprises an azimuthally rotatable pod, which comprises a propeller shaft on which said propeller is mounted, and
    said first rod and said mechanical link are comprised within said azimuthally rotatable pod.

6. The marine propulsion unit according to claim 5, wherein:
    said propeller shaft is at least partially tubular,
    said mechanical link comprises a second rod that is located at least partly inside said propeller shaft,
    a first joint between said at least one of said blades and said second rod is configured to convert a change in said pitch angle into a longitudinal movement of said second rod, and
    a second joint between said second rod and said first rod is configured to convert a longitudinal movement of said second rod into a rotation of said first rod about its longitudinal axis.

7. The marine propulsion unit according to claim 5, wherein:
    the azimuthally rotatable pod comprises a shank, a longitudinal axis of said shank is the rotation axis of said azimuthal rotation,
an upper end of said shank defines a level at which said azimuthally rotatable pod connects to a hull of a vessel, and
at least one of
a) said second end of said first rod, or
b) the coupling between the second end of said first rod and said indicator extends out of the upper end of said shank, allowing said indicator to be located inside the hull of said vessel.

8. The pitch angle indicator system for indicating a pitch angle of blades of a propeller of a marine propulsion unit, comprising:
a first rod,
a mechanical link coupled between at least one of said blades and a first end of said first rod, and
an indicator coupled to a second end of said first rod, in which:
said mechanical link is configured to convert a change in said pitch angle into a rotation of said first rod about its longitudinal axis, and
said indicator is configured to provide an indication of the amount of rotation of said first rod about said longitudinal axis,
and in which the coupling between said first rod and said indicator comprises:
a third joint configured to convert a rotation of said first rod about its longitudinal axis into a rotation of an indicator shaft, and
a compensator mechanism configured to compensate for movements of a larger entity, part of which is said first rod, from the indication provided by the indicator
said third joint comprises:
a first gear rim,
a turning mechanism configured to convert a rotation of said first rod about its longitudinal axis into rotation of said first gear rim about its center point,
a first indicator disc mounted on an indicator shaft, and
a first transmission configured to convert a rotation of said first gear rim about its center point into rotation of said indicator shaft,
and that said compensator mechanism comprises:
a second gear rim, concentric with said first gear rim and configured to maintain its rotational position in relation to the first gear rim when the pitch angle is constant,
a second indicator disc, concentric with said first indicator disc and mounted on a second compensator shaft concentric with said indicator shaft, and
a second transmission configured to convert a rotation of said second gear rim about its center point into rotation of said second compensator shaft.

9. The pitch angle indicator system according to claim 8, wherein said mechanical link comprises:
a second rod,
a first joint between said at least one of said blades and said second rod, configured to convert a change in said pitch angle into a longitudinal movement of said second rod, and
a second joint between said second rod and said first rod, configured to convert a longitudinal movement of said second rod into a rotation of said first rod about its longitudinal axis.

10. The pitch angle indicator system according to claim 9, wherein said second joint comprises:
a transmitting arm attached to said second rod,
a pivot arm attached to said first rod, said pivot arm extending to a hinge point offset from the longitudinal axis of the first rod, and
a link piece pivotally attached between said transmitting arm and said hinge point in the pivot arm.

11. The marine propulsion unit, comprising:
a propeller with blades that have a variable pitch angle, and
a pitch angle indicator system according to claim 8 for indicating the pitch angle of the blades of said propeller.

12. The marine propulsion unit according to claim 11, wherein:
the marine propulsion unit comprises an azimuthally rotatable pod, which comprises a propeller shaft on which said propeller is mounted, and
said first rod and said mechanical link are comprised within said azimuthally rotatable pod.

13. The marine propulsion unit according to claim 12, wherein:
said propeller shaft is at least partially tubular,
said mechanical link comprises a second rod that is located at least partly inside said propeller shaft,
a first joint between said at least one of said blades and said second rod is configured to convert a change in said pitch angle into a longitudinal movement of said second rod, and
a second joint between said second rod and said first rod is configured to convert a longitudinal movement of said second rod into a rotation of said first rod about its longitudinal axis.

14. The marine propulsion unit according to claim 12, wherein:
the azimuthally rotatable pod comprises a shank,
a longitudinal axis of said shank is the rotation axis of said azimuthal rotation,
an upper end of said shank defines a level at which said azimuthally rotatable pod connects to a hull of a vessel, and
at least one of
a) said second end of said first rod, or
b) the coupling between the second end of said first rod and said indicator extends out of the upper end of said shank, allowing said indicator to be located inside the hull of said vessel.

* * * * *